US012779714B2

(12) United States Patent
Petrelli

(10) Patent No.: US 12,779,714 B2
(45) Date of Patent: Nov. 3, 2026

(54) ADJUSTING AN EXPOSURE DISTANCE IN A HAIR-CUTTING UNIT FOR A ROTARY ELECTRIC SHAVER

(71) Applicant: KONINKLIJKE PHILIPS N.V., Eindhoven (NL)

(72) Inventor: Marcus Cornelis Petrelli, Groningen (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 78 days.

(21) Appl. No.: 18/848,957

(22) PCT Filed: Mar. 13, 2023

(86) PCT No.: PCT/EP2023/056262
§ 371 (c)(1),
(2) Date: Sep. 20, 2024

(87) PCT Pub. No.: WO2023/180106
PCT Pub. Date: Sep. 28, 2023

(65) Prior Publication Data

US 2025/0205914 A1 Jun. 26, 2025

(30) Foreign Application Priority Data

Mar. 24, 2022 (EP) .................................... 22164206

(51) Int. Cl.
*B26B 19/14* (2006.01)
*B26B 19/38* (2006.01)

(52) U.S. Cl.
CPC ........ *B26B 19/145* (2013.01); *B26B 19/3886* (2013.01)

(58) Field of Classification Search
CPC . B26B 19/145; B26B 19/3886; B26B 19/143; B26B 19/14; B26B 19/146;
(Continued)

(56) References Cited

U.S. PATENT DOCUMENTS 2,213,291 A 9/1940 Nicholas
3,233,323 A 2/1966 Josef
(Continued)

FOREIGN PATENT DOCUMENTS

EP 0329243 A1 * 8/1989 ............. B26B 19/14
EP 0329244 A1 * 8/1989 ........... B26B 19/143
(Continued)

OTHER PUBLICATIONS

International Search report and Written Opinion of PCT/EP2023/056262, dated May 26, 2023.

*Primary Examiner* — Boyer D Ashley
*Assistant Examiner* — Ella L Keena

(57) ABSTRACT

In a hair-cutting unit (4) for a rotary electric shaver, which is of the type comprising an external cutting member (10), an internal cutting member and a supporting member (30), an exposure distance (de) over which a skin-contacting surface (12) of a shaving track of the external cutting member (10) protrudes relative to an upper surface (31) of the supporting member (30) is adjustable. To this end, a conversion mechanism (40) having a first plurality of mutually spaced ramp elements (41) and a second plurality of mutually spaced flexible elements (42) for interaction with the ramp elements (41) is provided. Depending on the rotational direction of a relative rotation of the external cutting member (10) and the supporting member (30) about a central axis (14) of the hair-cutting unit (4), the flexible elements (42) are made to flex either upwardly or downwardly in an axial direction (A).

15 Claims, 6 Drawing Sheets

(58) Field of Classification Search
CPC ....... B26B 19/20; B26B 19/205; B26B 19/28; F16H 2025/2096; F16H 2049/008
See application file for complete search history.

(56) References Cited

U.S. PATENT DOCUMENTS

| | | | | | |
|---|---|---|---|---|---|
| 3,992,775 | A * | 11/1976 | De Vries | B26B 19/145 30/34.2 |
| 5,687,481 | A * | 11/1997 | De Boer | B26B 19/388 30/43.6 |
| 2004/0163258 | A1* | 8/2004 | Uchiyama | B26B 19/141 30/43.2 |
| 2007/0256302 | A1* | 11/2007 | Okabe | B26B 19/145 30/43.6 |
| 2021/0347073 | A1 | 11/2021 | Petrelli | |
| 2022/0212358 | A1 | 7/2022 | Petrelli | |

FOREIGN PATENT DOCUMENTS

| | | | | |
|---|---|---|---|---|
| EP | 0484795 | A1 | 5/1992 | |
| EP | 1902818 | A2 * | 3/2008 | B26B 19/14 |
| EP | 3486047 | A1 * | 5/2019 | B26B 19/386 |
| EP | 3738730 | A1 | 11/2020 | |
| JP | 2000014942 | A * | 1/2000 | B26B 19/143 |
| RU | 2101166 | C1 | 1/1998 | |
| WO | 2008010139 | A1 | 1/2008 | |
| WO | 2014184065 | A1 | 11/2014 | |
| WO | WO-2020094432 | A1 * | 5/2020 | B26B 19/143 |
| WO | WO-2020229503 | A1 * | 11/2020 | B26B 19/3853 |

* cited by examiner

ADJUSTING AN EXPOSURE DISTANCE IN A HAIR-CUTTING UNIT FOR A ROTARY ELECTRIC SHAVER

CROSS-REFERENCE TO PRIOR APPLICATIONS

This application is the U.S. National Phase application under 35 U.S.C. § 371 of International Application No. PCT/EP2023/056262, filed on Mar. 13, 2023, which claims the benefit of European Patent Application No. 22164206.9, filed on Mar. 24, 2022. These applications are hereby incorporated by reference herein.

FIELD OF THE INVENTION

The invention relates to a hair-cutting unit for a rotary electric shaver, comprising:

- an external cutting member with a shaving track having hair-entry openings;
- an internal cutting member which is covered by and rotatable relative to the external cutting member about a central axis of the hair-cutting unit;
- a supporting member surrounding and supporting the external cutting member; and
- an adjustment system to adjust an exposure distance over which a skin-contacting surface of the shaving track protrudes relative to an upper surface of the supporting member, comprising a drive system to realize a relative rotation of the external cutting member and the supporting member about the central axis and a conversion mechanism to convert the relative rotation of the external cutting member and the supporting member about the central axis into a relative movement of the external cutting member and the supporting member in an axial direction parallel to the central axis.

Further, the invention relates to a shaving assembly, comprising at least one hair-cutting unit as mentioned here before and a base unit supporting the at least one hair-cutting unit, and also relates to a rotary electric shaver comprising a main body and such a shaving assembly, wherein the base unit of the shaving assembly is connected to the main body.

BACKGROUND OF THE INVENTION

Rotary electric shavers and shaving assemblies for rotary electric shavers are well known. Rotary electric shavers are generally used to shave body hair, which may be facial hair, and are powered by electric supply mains and/or by electric energy storage devices such as batteries.

In a generally known set-up, a shaving assembly comprises an assembly of a base unit and at least one hair-cutting unit supported by the base unit. Traditionally, the hair-cutting unit comprises a combination of an external cutting member having a shaving track provided with hair-entry openings as a non-driven component and an internal cutting member as a driven component, wherein at least the internal cutting member has one or more cutting edges. In such a case, use of the shaving assembly as incorporated in a rotary electric shaver involves putting the shaving assembly to an operation mode in which the internal cutting member of the hair-cutting unit is actually moved, and moving the shaving assembly over the skin in such a way that the shaving track of the external cutting member of the hair-cutting unit faces and contacts the skin. In this process, hairs protruding from the skin are caught in an interior space of the hair-cutting unit in which they are made to abut against the external cutting member at the position of a hair-entry opening and are cut through when they are encountered by a cutting edge of the rotating internal cutting member.

An ongoing issue in the field of rotary electric shavers is a search for practical ways to combine high comfort with high shaving performance, particularly high shaving closeness. For example, an option of rotating the external cutting member relative to a surrounding stationary supporting member is investigated. This may increase the hair-catching ability of the hair-cutting unit, because the skin is enabled to encounter more open area of the external cutting member, i.e. more hair-entry openings. Also, an increase of comfort may be obtained, because the skin does not have time/opportunity to dome into the shaving track and the friction vector of contact of the shaving track to the skin is continuously moving around, resulting in lower friction.

Advantageously, the hair-cutting unit is designed such that a user is offered a possibility to adjust the exposure distance over which a skin-contacting surface of the shaving track protrudes relative to an upper surface of the supporting member according to personal desire. Generally speaking, a large exposure distance involves high shaving closeness at the expense of comfort, while a small exposure distance involves high comfort at the expense of shaving closeness. It is an object of the invention to provide a hair-cutting unit which is of the type comprising an adjustment system to adjust the exposure distance, wherein the adjustment system is effective, reliable and robust, yet does not take a significant amount of space in the hair-cutting unit and does not add to complexity of a process of disassembling and assembling the hair-cutting unit, such as for cleaning purposes. The hair-cutting unit according to the invention may be configured to realize the above-mentioned option of rotating of the external cutting member during operation, but this is not essential.

SUMMARY OF THE INVENTION

The invention provides a hair-cutting unit for a rotary electric shaver, comprising:

- an external cutting member with a shaving track having hair-entry openings;
- an internal cutting member which is covered by and rotatable relative to the external cutting member about a central axis of the hair-cutting unit;
- a supporting member surrounding and supporting the external cutting member; and
- an adjustment system to adjust an exposure distance over which a skin-contacting surface of the shaving track protrudes relative to an upper surface of the supporting member, comprising a drive system to realize a relative rotation of the external cutting member and the supporting member about the central axis and a conversion mechanism to convert the relative rotation of the external cutting member and the supporting member about the central axis into a relative movement of the external cutting member and the supporting member in an axial direction parallel to the central axis;

wherein the conversion mechanism comprises:

- a first plurality $N_1$ of mutually spaced ramp elements arranged on one of an inner surface of the supporting member which surrounds the external cutting member and a circumferential outer surface of the external cutting member, said ramp elements each being inclined relative to an imaginary plane perpendicular to the central axis and each having an axial extension in the axial direction; and a second plurality $N_2$ of mutually spaced flexible elements arranged on the other of the inner surface of the supporting member and the outer surface of the external cutting member for interaction with the ramp elements, said flexible elements each being flexible in the axial direction, and said flexible elements being positioned relative to the ramp elements such that, in a case of the relative rotation of the external cutting member and the supporting member about the central axis being in a first rotational direction, the flexible elements contact the ramp elements at an upper side of the ramp elements facing the shaving track and are made to flex upwardly while sliding over the ramp elements, and in a case of the relative rotation of the external cutting member and the supporting member about the central axis being in a second rotational direction opposite to the first rotational direction, the flexible elements contact the ramp elements at a lower side of the ramp elements facing away from the shaving track and are made to flex downwardly while sliding over the ramp elements.

It follows from the above definition of the hair-cutting unit according to the invention that the adjustment system which is included in the hair-cutting unit to adjust the exposure distance comprises a conversion mechanism to convert a relative rotation of the external cutting member and the supporting member about the central axis into a relative movement of the external cutting member and the supporting member in the axial direction, and that this conversion mechanism comprises a combination of a first plurality $N_1$ of mutually spaced ramp elements and a second plurality $N_2$ of mutually spaced flexible elements, wherein one type of said elements is arranged on the inner surface of the supporting member which surrounds the external cutting member, and wherein the other type of said elements is arranged on the circumferential outer surface of the external cutting member. Each of the ramp elements is inclined relative to an imaginary plane perpendicular to the central axis, and each of the ramp elements has an axial extension in the axial direction. The flexible elements serve for interaction with the ramp elements, and each of the flexible elements is flexible in the axial direction. The configuration of the conversion mechanism is such that the rotational direction of the relative rotation of the external cutting member and the supporting member about the central axis determines whether the flexible elements contact the ramp elements at the upper sides of the ramp elements facing the shaving track and are made to flex upwardly while sliding over the upper sides of the ramp elements, or whether the flexible elements contact the ramp elements at the lower sides of the ramp elements facing away from the shaving track and are made to flex downwardly while sliding over the lower sides of the ramp elements. In this way, it is achieved that in the first case, a relative axial position of the external cutting member and the supporting member is obtained in which the one of the external cutting member and the supporting member on which the flexible elements are present is lifted relative to the other of the external cutting member and the supporting member in the axial direction, and that in the second case, a relative axial position of the external cutting member and the supporting member is obtained in which the one of the external cutting member and the supporting member on which the flexible elements are present is lowered relative to the other of the external cutting member and the supporting member in the axial direction. Thus, on the basis of the inclined orientation of the ramp elements and the capability of the flexible elements to flex up and down, it is achieved that varying the rotational direction of the relative rotation of the external cutting member and the supporting member about the central axis results in varying the exposure distance. For the sake of completeness, it is noted that terms such as "upper", "lifted", "lowered", "up" and "down" as used in the present text are to be understood in relation to the assumption that the position of the shaving track relative to the position of the internal cutting member is a higher position in the axial direction.

The ramp elements and the flexible elements may be of any suitable design. The ramp elements can be provided as ribs on an annular carrier or directly on the respective surface, while the flexible elements can be provided as end tabs of flexible levers arranged on an annular carrier or directly on the respective surface. An advantage of the design of the conversion mechanism of the adjustment system with the ramp elements and the flexible elements relates to a situation in which a user disassembles the hair-cutting unit for the purpose of cleaning or replacement of components, and subsequently puts the hair-cutting unit back to together again. The fact is that a setting in which the exposure distance is at a maximum is not obtained without relative rotation of the external cutting member and the supporting member about the central axis in the respective rotational direction, so that there is no risk that this setting, which involves the lowest level of comfort and the highest level of danger of damage to the skin, is accidentally obtained.

Advantageously, the ramp elements and the flexible elements are regularly distributed about the central axis. A dimension of the flexible elements in a tangential direction about the central axis does not necessarily need to be larger than a dimension of a space between adjacent ramp elements in said tangential direction in order to avoid situations in which all of the flexible elements are at positions between the ramp elements in said direction. The fact is that the hair-cutting unit according to the invention can be designed with different values in respect of the first plurality $N_1$ and the second plurality $N_2$. In particular, it is possible to choose the first plurality $N_1$ so as to be larger than the second plurality $N_2$. This is preferably done in such a way that it is achieved that, in any relative rotational position of the external cutting member and the supporting member about the central axis, at least three of the flexible elements contact the upper sides of at least three of the ramp elements in case the relative rotation of the external cutting member and the supporting member is in the first rotational direction, and at least three of the flexible elements contact the lower sides of at least three of the ramp elements in case the relative rotation of the external cutting member and the supporting member is in the second rotational direction. This results in high stability of the hair-cutting unit under all circumstances. Values of the first plurality $N_1$ and the second plurality $N_2$, respectively, may be 15 and 12, to mention a practical example.

In a practical embodiment of the hair-cutting unit according to the invention, the conversion mechanism of the adjustment system further comprises:

a first abutment member and a second abutment member for delimiting the relative movement of the external cutting member and the supporting member in the axial direction, said first abutment member and second abutment member defining, respectively, a maximum and a minimum of the exposure distance;

wherein:

the axial extension of the ramp elements is larger than a difference between the maximum and the minimum of the exposure distance.

The respective abutment members can be provided in any suitable way, and may comprise planar surfaces facing each other at a distance, for example. It may be practical if at least one of the abutments members is included in the supporting member. In any case, having respective abutment members in the hair-cutting unit is a practical way of defining a maximum and a minimum of the exposure distance. By choosing the axial extension of the ramp elements to be larger than a difference between the maximum and the minimum of the exposure distance, it is achieved that the flexible elements are enabled to contact, respectively, the upper sides or the lower sides of the ramp elements with a certain contact force in the relative axial positions of the external cutting member and the supporting member corresponding to, respectively, the maximum and the minimum of the exposure distance. In this respect, it may be practical if in the axial direction, a position of any flexible elements free from contact to the ramp elements is a central position relative to the upper sides and the lower sides of the ramp elements when the exposure distance has a central value between the maximum and the minimum. As a result, said contact force between the flexible elements and the ramp elements will be substantially equal at the maximum and at the minimum of the exposure distance.

In a practical embodiment of the hair-cutting unit according to the invention, the external cutting member comprises a flange at a position between the first abutment member and the second abutment member in the axial direction, wherein an upper surface of the flange contacting the first abutment member results in the maximum of the exposure distance, and wherein a lower surface of the flange contacting the second abutment member results in the minimum of the exposure distance. In case the external cutting member is rotatable about the central axis, it may further be so that the drive system of the adjustment system is configured to realize a rotation of the external cutting member by engagement with the flange. For example, the drive system comprises a driving gear wheel, and the flange is provided with peripheral toothing for enabling the driving gear wheel to interact with the flange and to thereby put the external cutting member in rotational motion.

The invention is suitable to be applied in a conventional situation in which it is intended to only continuously rotate the internal cutting member about the central axis during a shaving action while maintaining a stationary position about the central axis of both the external cutting member and the supporting member, and also to be applied in other situations, including a situation in which it is intended to not only have continuous rotation of the internal cutting member about the central axis during a shaving action, but also continuous rotation of the external cutting member about the central axis while maintaining a stationary position of the supporting member about the central axis. In view thereof, the following two options in respect of the drive system of the adjustments system are covered by the invention: i) the drive system of the adjustment system is configured to realize a relative rotation of the external cutting member and the supporting member over a limited angle about the central axis, and ii) the drive system of the adjustment system is configured to realize a continuous relative rotation of the external cutting member and the supporting member about the central axis.

In the case that i) the drive system of the adjustment system is configured to realize a relative rotation of the external cutting member and the supporting member over a limited angle about the central axis, varying the exposure distance may be based on the following features:

a relative rotation of the external cutting member and the supporting member over the limited angle about the central axis in the first rotational direction results in a change of the exposure distance from the minimum to the maximum; and a relative rotation of the external cutting member and the supporting member over the limited angle about the central axis in the second rotational direction results in a change of the exposure distance from the maximum to the minimum.

Advantageously, the hair-cutting unit is configured such that the limited angle does not need to be larger than 90°, so that varying the exposure distance can be done very quickly. This implies that when at least two hair-cutting units are used in a shaving assembly, there is no need for additional measures aimed at realizing synchronization of the hair-cutting units as far as the setting of the exposure distance in each of the hair-cutting units is concerned.

In the case that ii) the drive system of the adjustment system is configured to realize a continuous relative rotation of the external cutting member and the supporting member about the central axis, varying the exposure distance may be based on the following features:

a continuous relative rotation of the external cutting member and the supporting member about the central axis in the first rotational direction results in the maximum of the exposure distance;

a continuous relative rotation of the external cutting member and the supporting member about the central axis in the second rotational direction results in the minimum of the exposure distance;

a change of the rotational direction of the continuous relative rotation of the external cutting member and the supporting member about the central axis from the first rotational direction to the second rotational direction results in a change of the exposure distance from the maximum to the minimum; and a change of the rotational direction of the continuous relative rotation of the external cutting member and the supporting member about the central axis from the second rotational direction to the first rotational direction results in a change of the exposure distance from the minimum to the maximum.

For the sake of completeness, it is noted that the difference between the first case and the latter case does not reside in the way in which a desired value of the exposure distance is obtained, but rather in the fact that in the first case, the relative rotation of the external cutting member and the supporting member about the central axis in either rotational direction is stopped (shortly) after a desired value of the exposure distance has been obtained, whereas in the latter case, said relative rotation is continued for reasons other than exposure distance setting.

The above-described and other aspects of the invention will be apparent from and elucidated with reference to the following detailed description of an embodiment of a hair-cutting unit comprising an external cutting member, an internal cutting member, a supporting member and an adjustment system, wherein the adjustment system serves to adjust an exposure distance over which a skin-contacting surface of a shaving track of the external cutting member protrudes relative to an upper surface of the supporting member, and wherein the adjustment system comprises a conversion mechanism which is configured to function on the basis of interaction between ramp elements arranged on an inner surface of the supporting member which surrounds the external cutting member and flexible elements arranged on a circumferential outer surface of the external cutting member.

BRIEF DESCRIPTION OF THE DRAWINGS

The invention will now be explained in greater detail with reference to the figures, in which equal or similar parts are indicated by the same reference signs, and in which.

DETAILED DESCRIPTION OF THE EMBODIMENTS

Figure 1:
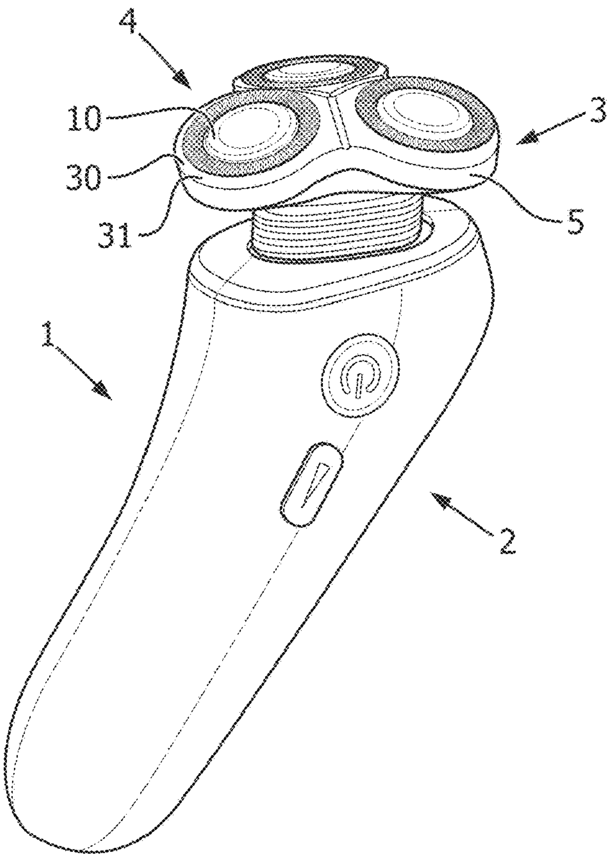
FIG. 1 diagrammatically shows a perspective view of a rotary electric shaver according to an embodiment of the invention, which rotary electric shaver comprises a shaving assembly and a main body.

FIG. 1 shows an electric shaver of the rotary type, which is suitable to be used for shaving a beard, as a practical example of a rotary electric shaver 1 according to an embodiment of the invention. The rotary electric shaver 1 comprises a main body 2 and a shaving assembly 3, wherein the main body 2 is designed to enable a user of the shaver 1 to take hold of the shaver 1 and to handle the shaver 1, and wherein the shaving assembly 3 is the part of the shaver 1 that is to be positioned on and moved over the skin for hair removal. In the present example, the shaving assembly 3 comprises three hair-cutting units 4 supported on a base unit 5 of the shaving assembly 3. When the rotary electric shaver 1 is actually applied for the purpose of performing a shaving action, the actual process of cutting of hairs protruding from the skin takes place at the position of the hair-cutting units 4. In the context of the invention, the number of hair-cutting units 4 can be chosen freely and does not necessarily need to be three, the number being at least one. The main body 2 may have a function in accommodating at least one electric motor for driving components of the respective hair-cutting units 4. The main body 2 may further include means such as a rechargeable battery for powering the at least one electric motor. It is practical if the shaving assembly 3 and the main body 2 are releasably connectable to each other, as known per se in the field of rotary electric shavers.

Figure 2:
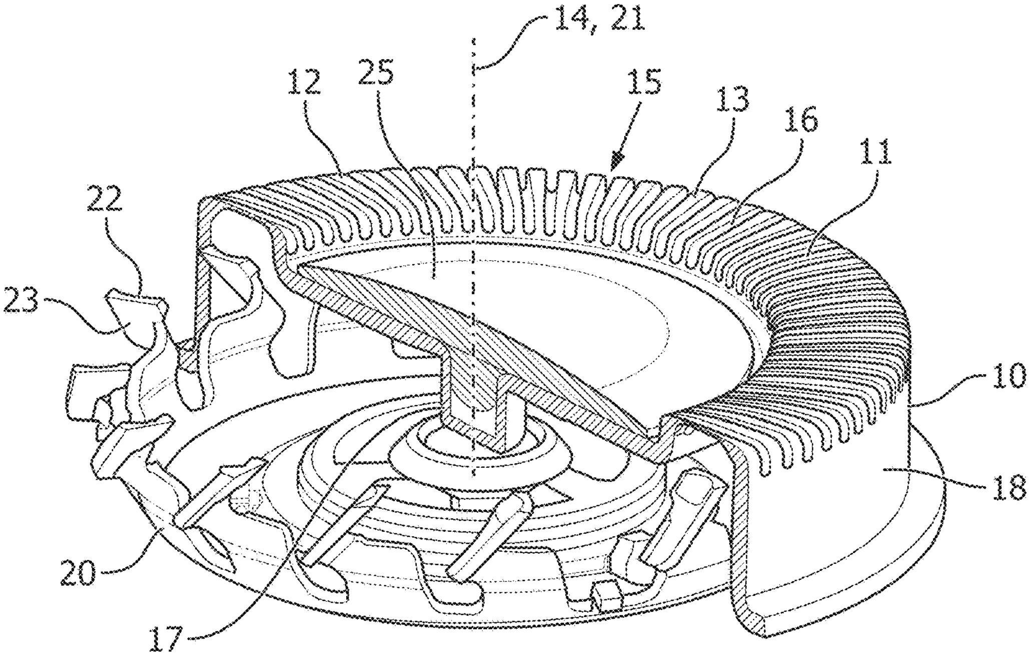
FIG. 2 diagrammatically shows a perspective view of an external cutting member, a decorative cap and an internal cutting member of a hair-cutting unit of the shaving assembly, wherein both the external cutting member and the cap are shown with a portion cut away.
Figure 3:
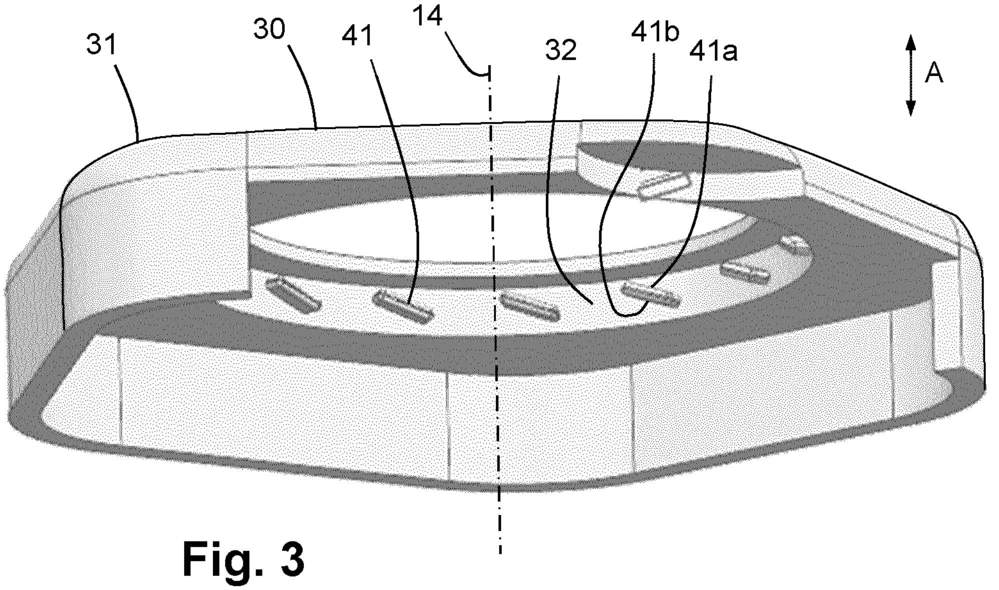
FIG. 3 diagrammatically shows a perspective view of a supporting member of the hair-cutting unit and ramp elements arranged thereon.
Figure 4:
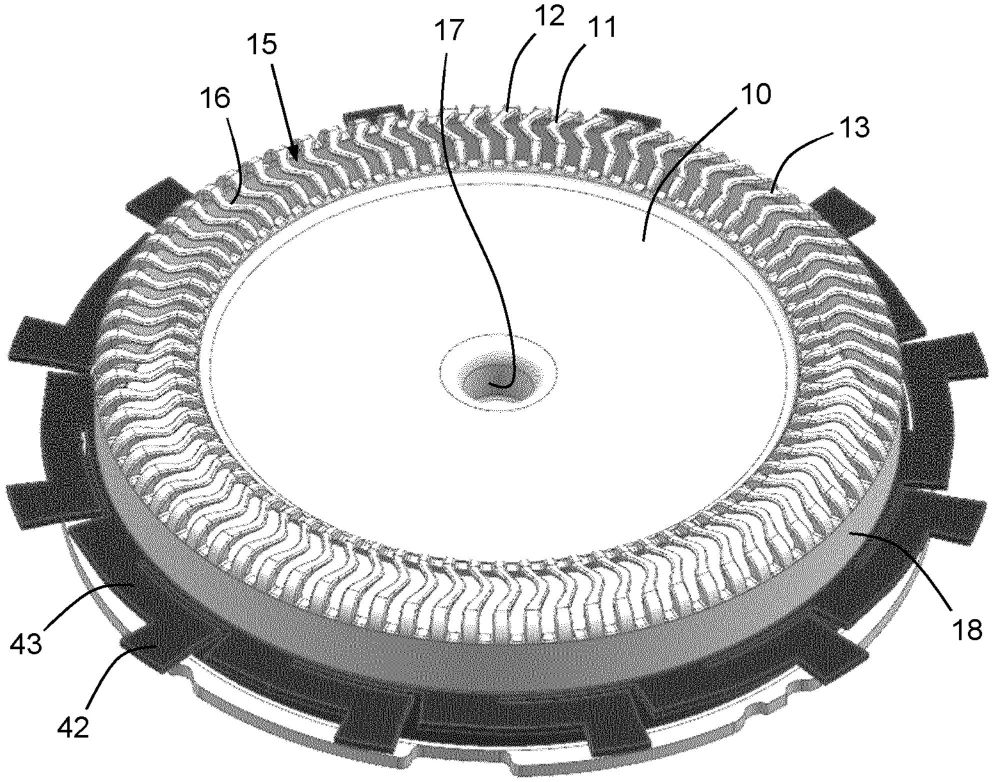
FIG. 4 diagrammatically shows a perspective view of the external cutting member and flexible elements arranged thereon.

Each of the hair-cutting units 4 comprises a combination of an external cutting member 10 and an internal cutting member 20, as will now be described in more detail with reference to FIG. 2. The external cutting member 10 is of a generally cup-shaped design and is thereby suitable for at least partially accommodating the internal cutting member 20 in its interior. The external cutting member 10 has an annular shaving track 11, an upper surface of the shaving track 11 being a skin-contacting surface 12 intended to face and contact the skin to be subjected to a shaving action. The shaving track 11 comprises lamellae 13 extending along the width of the shaving track 11, in a substantially radial direction relative to a central axis 14 of the hair-cutting unit 4, which coincides with a rotational axis 21 about which the internal cutting member 20 is rotatable relative to the external cutting member 10. Apertures as present between the lamellae 13 constitute hair-entry openings 15 of the shaving track 11. Sides of the lamellae 13 constitute hair-cutting surfaces 16 suitable for cutting off hairs in cooperation with hair-cutting edges 22 of hair-cutting elements 23 of the internal cutting member 20. The invention also relates to cases in which the shaving track 11 does not comprise lamellae 13 or does not only comprise lamellae 13, such as cases in which the entire shaving track 11 is provided with teeth-like elements and/or a pattern of (circular) holes instead of or in addition to lamellae 13. Also, the invention relates to cases in which more than one shaving track 11 is present in the external cutting member 10.

A shaving action can be performed when the internal cutting member 20 is activated to rotate and a portion of skin is actually contacted by the external cutting member 10 at the position of the skin-contacting surface 12. Activation of the internal cutting member 20 may take place in a known manner by means of a drive mechanism of the rotary electric shaver 1. When the combination of the external cutting member 10 and the internal cutting member 20 is moved over the portion of skin while the internal cutting member 20 is driven to rotate, it is achieved that hairs protruding from the portion of skin are caught in the hair-entry openings 15 of the shaving track 11 of the external cutting member 10 and are cut off in that position as result of a cooperation between the hair-cutting surfaces 16 of the shaving track 11 of the external cutting member 10 and the hair-cutting edges 22 of the hair-cutting elements 23 of the rotating internal cutting member 20.

Besides the shaving track 11, the external cutting member 10 includes a central portion 17 comprising a central bearing portion which is designed to be used in rotationally supporting the internal cutting member 20 in the hair-cutting unit 4. The central portion 17 of the external cutting member 10 also serves for supporting a decorative cap 25 configured to cover part of the exterior surface of the external cutting member 10. In the present example, the central portion 17 comprises a centrally located recess, and the cap 25 comprises a projection which is accommodated in the recess.

Each of the hair-cutting units 4 further comprises a supporting member 30. The supporting member 30 has a upper surface 31 surrounding the external cutting member 10. According to the invention, each hair-cutting unit 4 comprises an adjustment system to adjust an exposure distance $d_e$ over which the skin-contacting surface 12 of the shaving track 11 protrudes relative to the upper surface 31 of the supporting member 30, as will now be explained with reference to FIGS. 3-12. On the basis of the presence of an adjustment system in the hair-cutting unit 4, a user is enabled to set the exposure distance $d_e$ in accordance with personal preferences, wherein it is to be noted that these personal preferences may be different for different skin areas to be subjected to a shaving action. Generally speaking, the adjustment system is configured to i) realize a relative rotation of the external cutting member 10 and the supporting member 30 about the central axis 14 and to ii) convert the relative rotation of the external cutting member 10 and the supporting member 30 about the central axis 14 into a relative movement of the external cutting member 10 and the supporting member 30 in an axial direction A parallel to the central axis 14. In the present example, the external cutting member 10 is rotatable, at least over a limited angle, and also displaceable in the axial direction A in a limited range, while the supporting member 30 is a stationary component of the hair-cutting unit 4. Hence, in the present example, realizing a relative rotation of the external cutting member 10 and the supporting member 30 about the central axis 14 is done by realizing a rotation of the external cutting member 10 about the central axis 14, and realizing a relative movement of the external cutting member 10 and the supporting member 30 in the axial direction A is done by realizing a movement of the external cutting member 10 in the axial direction A.

For the purpose of converting a rotation of the external cutting member 10 about the central axis 14 into a movement of the external cutting member 10 in the axial direction A, the adjustment system comprises a conversion mechanism 40 of which elements 41, 42 are shown in FIGS. 3-10. The fact is that the conversion mechanism 40 comprises mutually spaced ramp elements 41 and mutually spaced flexible elements 42 for interaction with the ramp elements 41. In the present example, the ramp elements 41 are arranged on an inner surface 32 of the supporting member 30 which surrounds the external cutting member 10, while the flexible elements 42 are arranged on a circumferential outer surface 18 of the external cutting member 10. Each of the ramp elements 41 is oriented so as to be inclined relative to an imaginary plane perpendicular to the central axis 14, wherein each of the ramp elements has an axial extension in the axial direction A.

Figure 5:
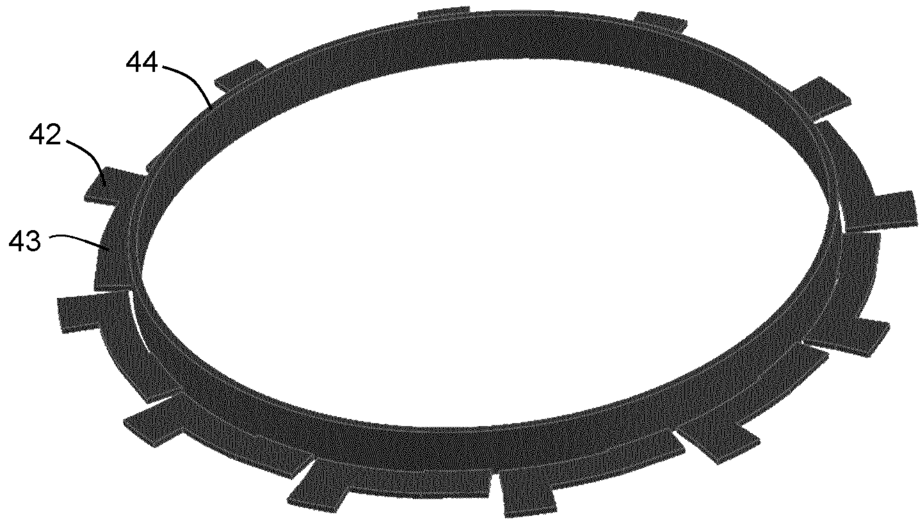
FIGS. 5 and 6 diagrammatically show a perspective view and a bottom view, respectively, of a component in which the flexible elements and a carrier of the flexible elements are integrated.
Figure 6:
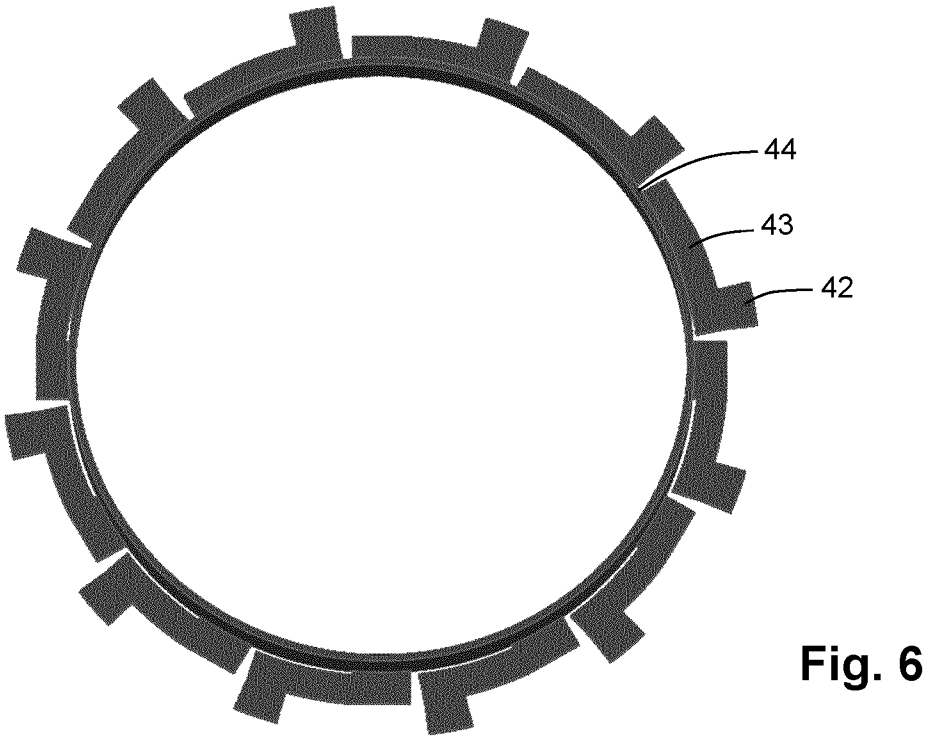
Figure 7:
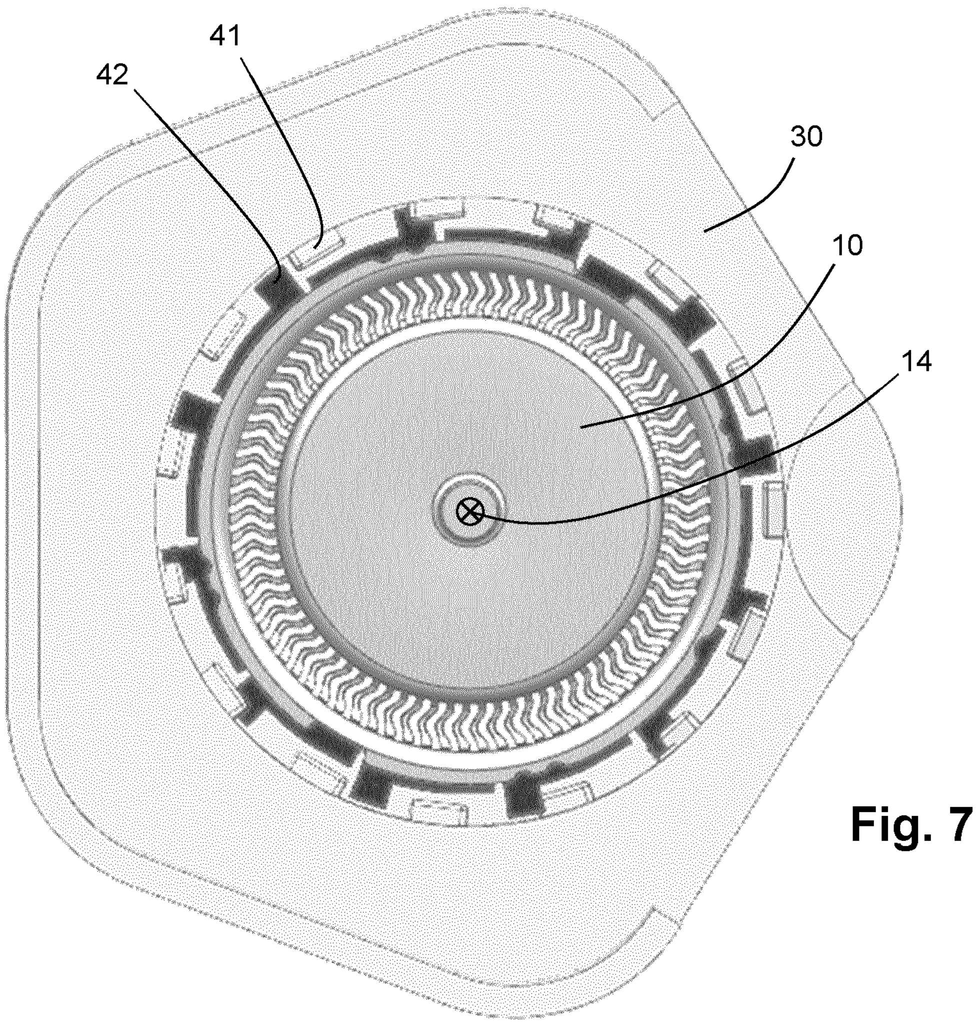
FIG. 7 diagrammatically shows a bottom view of an assembly of the supporting member with the ramp elements and the external cutting member with the flexible elements.

The ramp elements 41 are provided as ribs on the inner surface 32 of the supporting member 30, while the flexible elements 42 are provided as end tabs of flexible levers 43 arranged on an annular carrier 44 arranged on the external cutting member 10. The levers 43 and the carrier 44 are integrated in a single component which may be made of metal, for example, as illustrated in FIGS. 5 and 6. Further, as can be seen in FIG. 7, in the present example, the ramp elements 41 and the flexible elements 42 are regularly distributed about the central axis 14, wherein the ramp elements 41 come in a first plurality $N_1$ of 15, while the flexible elements 42 come in a second plurality $N_2$ of 12. The respective designs of the peripheral row of mutually spaced ramp elements 41 and the peripheral row of mutually spaced flexible elements 42 are chosen such that it is guaranteed that in any relative rotational position of the external cutting member 10 and the supporting member 30 about the central axis 14, at least three of the flexible elements 42 are in contact with at least three of the ramp elements 41.

Figure 8:
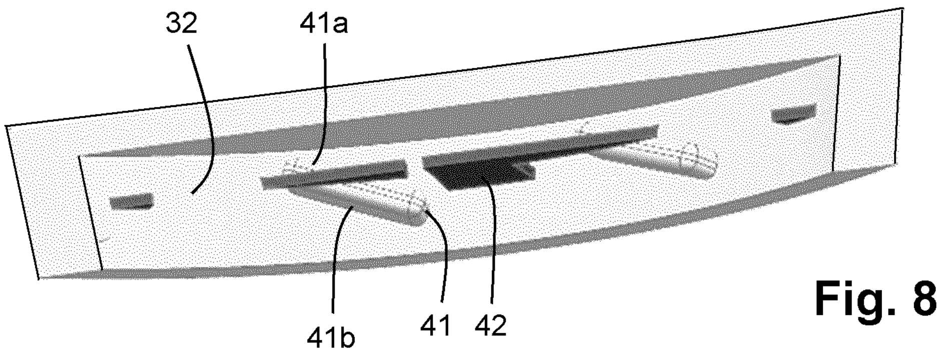
FIG. 8 illustrates how a flexible element interacts with the ramp elements.

As mentioned in the foregoing, the flexible elements 42 are for interaction with the ramp elements 41. The fact is that the positioning of the ramp elements 41 on the supporting member 30 and the positioning of the flexible elements 42 are adapted to each other such that the ramp elements 41 and the flexible elements 42 are at an overlapping axial position in the hair-cutting unit 4. The flexible elements 42 are comparable to leaf springs. In particular, the flexible elements 42 are flexible in the axial direction A. With reference to FIG. 8, it is noted that this implies that when the external cutting member 10 is rotated about the central axis 14 in an anticlockwise rotational direction, the flexible elements 42 contact the ramp elements 41 at an upper side 41*a* of the ramp elements 41 facing the shaving track 11 and are pushed upwardly by the ramp elements 41, so that a lifting force on the external cutting member 10 is generated, whereas when the external cutting member 10 is rotated about the central axis 14 in a clockwise rotational direction, the flexible elements 42 contact the ramp elements 41 at a lower side 41*b* of the ramp elements 41 facing away from the shaving track 11 and are pushed downwardly by the ramp elements 41, so that a lowering force on the external cutting member 10 is generated. It is this functionality of the conversion mechanism 40 that is useful to vary the exposure distance $d_e$. As seen at the level of a single flexible element 42, when the external cutting member 10 is rotated about the central axis 14, the flexible element 42 is continuously made to slide along successive ramp elements 41, at either the upper sides 41*a* or the lower sides 41*b* of the ramp elements 41 depending on the rotational direction of the rotational motion of the external cutting member 10, and to assume a neutral, unflexed state in the spaces between the ramp elements 41 because a dimension of the flexible elements 42 is small enough for the flexible elements 42 to fit in said spaces in their entirety.

Figure 9:
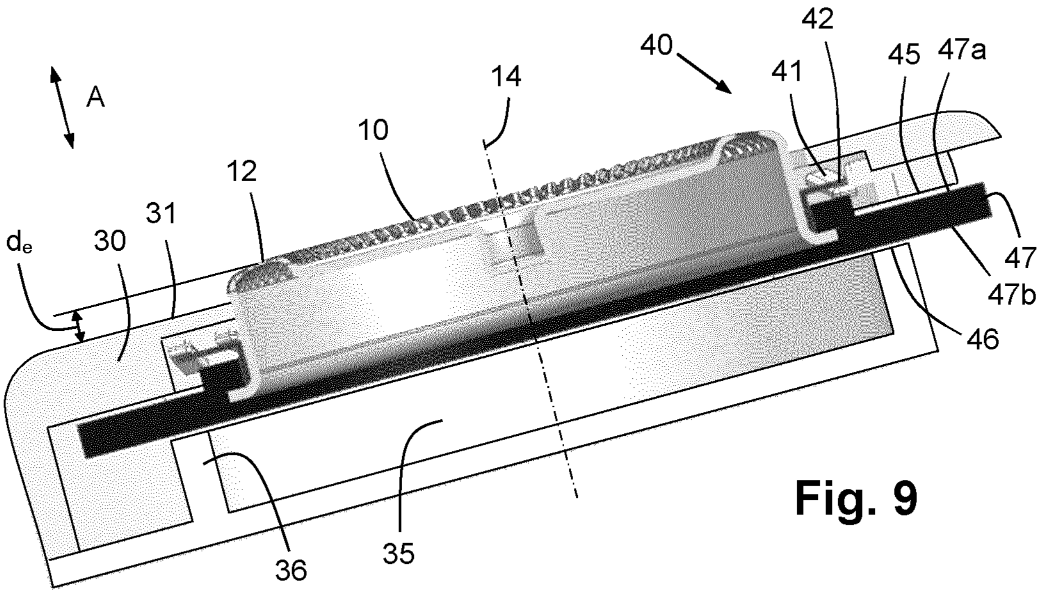
FIG. 9 diagrammatically shows a sectional view of the external cutting member, the supporting member and a hair chamber associated with the hair-cutting unit.
Figure 10:
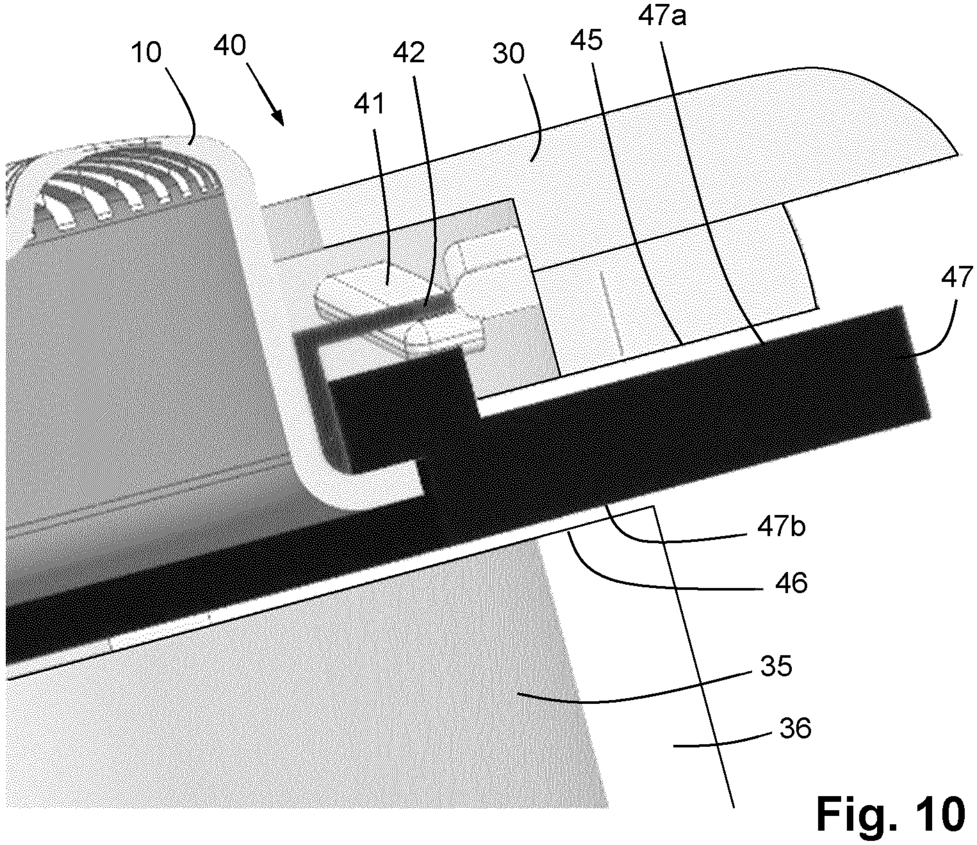
FIG. 10 shows a detail of FIG. 9.

With reference to FIGS. 9 and 10, it is noted that for the purpose of defining, respectively, a maximum and a minimum of the exposure distance $d_e$, the conversion mechanism 40 further comprises a first abutment member 45 and a second abutment member 46. In the present example, the first abutment member 45 comprises an annular surface area of the supporting member 30, and the second abutment member 46 comprises an upper surface of an annular wall 36 delimiting a hair chamber 35 associated with the hair-cutting unit 4. Further, the external cutting member 10 comprises a flange 47 at a position between the first abutment member 45 and the second abutment member 46 in the axial direction A. When the external cutting member 10 is rotated about the central axis 14 in the anticlockwise rotational direction, the lifting force on the external cutting member 10 thus obtained causes abutment of an upper surface 47*a* of the flange 47 against the first abutment member 45, whereby the maximum of the exposure distance $d_e$ is obtained, whereas when the external cutting member 10 is rotated about the central axis 14 in the clockwise rotational direction, the lowering force on the external cutting member 10 thus obtained causes abutment of a lower surface 47*b* of the flange 47 against the second abutment member 46. Thus, a maximum of the exposure distance $d_e$ is defined by the first abutment member 45, whereas a minimum of the exposure distance $d_e$ is defined by the second abutment member 46. Changing the exposure distance $d_e$ from the one value to the other is done by rotating the external cutting member 10 about the central axis 14 in the appropriate rotational direction, over an angular distance long enough for the flange 47 to reach a new axial position of abutment against the appropriate one of the first abutment member 45 and the second abutment member 46. The axial extension of the ramp elements 41 is larger than a difference between the maximum and the minimum of the exposure distance $d_e$, whereby it is guaranteed that the ramp elements 41 are contacted by the flexible elements 42 in any possible setting of the exposure distance $d_e$.

Figure 11:
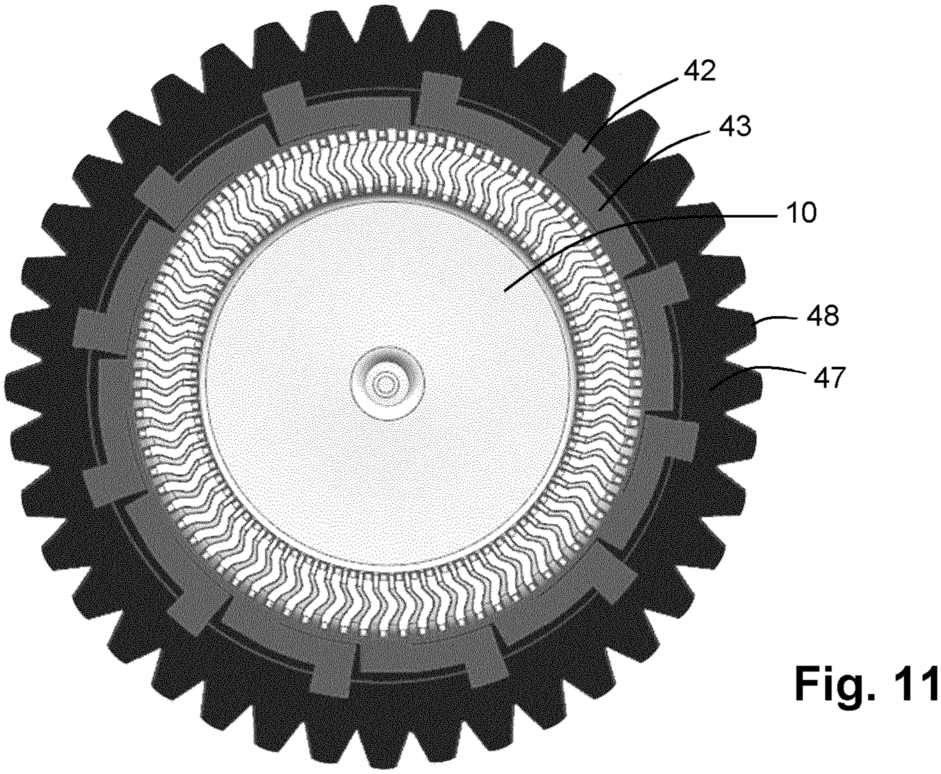
FIG. 11 diagrammatically shows a top view of the external cutting member with the flexible elements and further with a flange provided with peripheral toothing.
Figure 12:
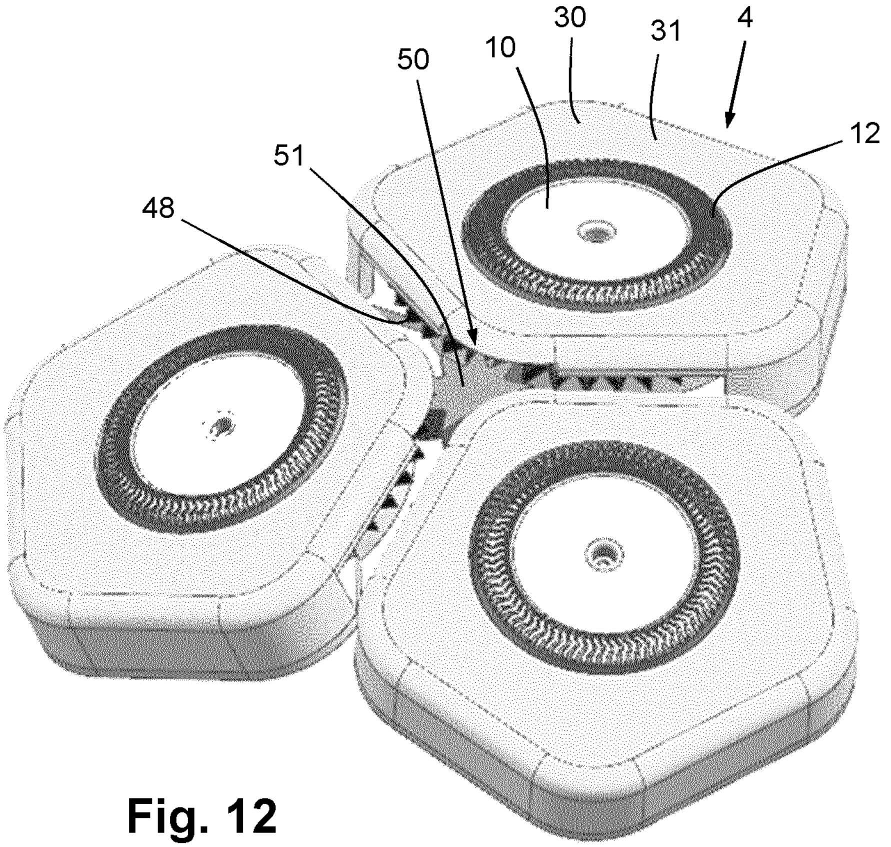
FIG. 12 illustrates how the respective external cutting members of three hair-cutting units of the shaving assembly are driven by a driving gear wheel arranged in a central position between the hair-cutting units.

For the purpose of realizing rotation of the external cutting member 10 about the central axis 14, the adjustment system comprises a drive system 50. In the present example, the flange 47 is provided with peripheral toothing 48, as can be seen in FIGS. 11 and 12, so that the external cutting member 10 can be driven by means of a gear wheel engaging the toothing 48. With reference to FIG. 12, it is noted that it is advantageous if one central gear wheel 51 is used for simultaneously driving the respective external cutting members 10 of the hair-cutting units 4. After a user has indicated a desire to change the value of the exposure distance $d_e$, such as through pressing an appropriate button or touching a touchscreen as may be present on the main body 2 or on a cradle for holding the rotary electric shaver 1, or using an app on a mobile device configured to control operation of the shaver 1, the central gear wheel 51 is put in rotational motion, wherein the rotational direction of the rotational motion is set such that the desired new value of the exposure distance $d_e$ can be obtained. This setting of the rotational direction of the rotational motion of the central gear wheel 51 can be done in any suitable way and by using any suitable control mechanism. For example, the central gear wheel 51 can be driven by an electric motor which is provided for that purpose only, and the electric motor is controlled to reverse the rotational direction of the output shaft thereof when a change of the value of the exposure distance $d_e$ is to be realized, or a coupling arrangement between the output shaft of the electric motor and the central gear wheel 51 is provided and is adjustable to reverse the way in which a rotation of the output shaft of the electric motor is transferred to the central gear wheel 51. Having a dedicated electric motor offers the possibility of operating the adjusting system independently from the internal cutting member 20 and changing the value of the exposure distance $d_e$ during a shaving action if so desired. Hence, the exposure setting $d_e$ can be an adaptive shaving feature.

In the present embodiment of the hair-cutting unit 4, one possibility is to operate the drive system 50 only when a change of the value of the exposure distance $d_e$ is desired, and to terminate rotation of the central gear wheel 51 as soon as the new value has been reached, or shortly after that. In the shown configuration, changing the value of the exposure distance $d_e$ takes less than a quarter turn of the central gear wheel 51 and each of the external cutting members 10 engaged by the central gear wheel 51. Another possibility is to continuously operate the drive system 50 so that the respective external cutting members 10 are continuously rotated about the respective central axes 14. This may be done as a measure aimed at increasing shaving comfort, for example. In that case, when it is desired to change the value of the exposure distance $d_e$, this is done by realizing rotation of the central gear wheel 51 in the appropriate direction, and this rotation is then continued for as long as rotation of the respective external cutting members 10 is desired. In either case, a newly set value of the exposure distance $d_e$ is maintained as long as the external cutting members 10 are not made to rotate about the central axis 14 in the rotational direction associated with the other value of the exposure distance $d_e$.

It will be clear to a person skilled in the art that the scope of the invention is not limited to the examples discussed in the foregoing, and that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in the present text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

In the foregoing, reference is made to a hair chamber 35 associated with the hair-cutting unit 4. In the context of the invention, it may be practical if the shaving assembly 3 comprises individual hair chambers, one hair chamber per hair-cutting unit 4, but that does not alter the fact that the invention is also applicable in situations in which a single hair chamber is shared between two or more hair-cutting units 4.

Notable aspects of the invention are summarized as follows. In a hair-cutting unit 4 for a rotary electric shaver 1, which is of the type comprising an external cutting member 10, an internal cutting member 20 and a supporting member 30, an exposure distance $d_e$ over which a skin-contacting surface 12 of a shaving track 11 of the external cutting member 10 protrudes relative to an upper surface 31 of the supporting member 30 is adjustable. To this end, an adjustment system is provided, which comprises a drive system 50 and a conversion mechanism 40 having a first plurality of mutually spaced ramp elements 41 and a second plurality of mutually spaced flexible elements 42 for interaction with the ramp elements 41. Depending on the rotational direction of a relative rotation of the external cutting member 10 and the supporting member 30 about a central axis 14 of the hair-cutting unit 4, the flexible elements 42 are made to flex either upwardly or downwardly in an axial direction A, and this is useful to move the external cutting member 10 and the supporting member 30 relative to each other in the axial direction A or to maintain a relative axial position of the external cutting member 10 and the supporting member 30 associated with either a maximum or a minimum of the exposure distance $d_e$. Respective abutment members 45, 46 at appropriate positions in the hair-cutting unit 4 may be used for defining said maximum and minimum of the exposure distance $d_e$.

The invention claimed is:

1. A hair-cutting unit for a rotary electric shaver, comprising:

an external cutting member with a shaving track having hair-entry openings;

an internal cutting member which is covered by and rotatable relative to the external cutting member about a central axis of the hair-cutting unit;

a supporting member surrounding and supporting the external cutting member; and an adjustment system to adjust an exposure distance (de) over which a skin-contacting surface of the shaving track protrudes relative to an upper surface of the supporting member, comprising a drive system to realize a relative rotation of the external cutting member and the supporting member about the central axis and a conversion mechanism to convert the relative rotation of the external cutting member and the supporting member about the central axis into a relative movement of the external cutting member and the supporting member in an axial direction parallel to the central axis; wherein the conversion mechanism comprises:

a first plurality of mutually spaced ramp elements arranged on one of an inner surface of the supporting member, the inner surface surrounding the external cutting member and a circumferential outer surface of the external cutting member, said ramp elements each being inclined relative to an imaginary plane perpendicular to the central axis and each having an axial extension in the axial direction; and a second plurality of mutually spaced flexible elements arranged on the other of the inner surface of the supporting member and the outer surface of the external cutting member for interaction with the ramp elements, said flexible elements each being flexible in the axial direction, and said flexible elements being positioned relative to the ramp elements such that, in a case of the relative rotation of the external cutting member and the supporting member about the central axis being in a first rotational direction, the flexible elements contact the ramp elements at an upper side of the ramp elements facing the shaving track and are made to flex upwardly while sliding over the ramp elements, and in a case of the relative rotation of the external cutting member and the supporting member about the central axis being in a second rotational direction opposite to the first rotational direction, the flexible elements contact the ramp elements at a lower side of the ramp elements facing away from the shaving track and are made to flex downwardly while sliding over the ramp elements.

2. The hair-cutting unit as claimed in claim 1, wherein the conversion mechanism of the adjustment system further comprises:

a first abutment member and a second abutment member for delimiting the relative movement of the external cutting member and the supporting member in the axial direction, said first abutment member and second abutment member defining, respectively, a maximum and a minimum of the exposure distance;

wherein:

the axial extension of the ramp elements is larger than a difference between the maximum and the minimum of the exposure distance.

3. The hair-cutting unit as claimed in claim 2, wherein in the axial direction, a position of any of the flexible elements free from contact to the ramp elements is a central position relative to the upper sides and the lower sides of the ramp elements when the exposure distance has a central value between the maximum and the minimum.

4. The hair-cutting unit as claimed in claim 2, wherein:

the external cutting member comprises a flange at a position between the first abutment member and the second abutment member in the axial direction;

an upper surface of the flange contacting the first abutment member results in the maximum of the exposure distance; and a lower surface of the flange contacting the second abutment member results in the minimum of the exposure distance.

5. The hair-cutting unit as claimed in claim 4, wherein the external cutting member is rotatable about the central axis, and wherein the drive system of the adjustment system is configured to realize a rotation of the external cutting member by engagement with the flange.

6. The hair-cutting unit as claimed in claim 2, wherein at least one of the abutment members is included in the supporting member.

7. The hair-cutting unit as claimed in claim 2, wherein:

the drive system of the adjustment system is configured to realize a relative rotation of the external cutting member and the supporting member over a limited angle about the central axis;

a relative rotation of the external cutting member and the supporting member over the limited angle about the central axis in the first rotational direction results in a change of the exposure distance from the minimum to the maximum; and a relative rotation of the external cutting member and the supporting member over the limited angle about the central axis in the second rotational direction results in a change of the exposure distance from the maximum to the minimum.

8. The hair-cutting unit as claimed in claim 7, wherein the limited angle is smaller than 90°.

9. The hair-cutting unit as claimed in claim 2, wherein:

the drive system of the adjustment system is configured to realize a continuous relative rotation of the external cutting member and the supporting member about the central axis;

the continuous relative rotation of the external cutting member and the supporting member about the central axis in the first rotational direction results in the maximum of the exposure distance;

the continuous relative rotation of the external cutting member and the supporting member about the central axis in the second rotational direction results in the minimum of the exposure distance;

a change of the rotational direction of the continuous relative rotation of the external cutting member and the supporting member about the central axis from the first rotational direction to the second rotational direction results in a change of the exposure distance from the maximum to the minimum; and the change of the rotational direction of the continuous relative rotation of the external cutting member and the supporting member about the central axis from the second rotational direction to the first rotational direction results in a change of the exposure distance from the minimum to the maximum.

10. The hair-cutting unit as claimed in claim 1, wherein the flexible elements are provided as end tabs of flexible levers arranged on an annular carrier.

11. The hair-cutting unit as claimed in claim 1, wherein the ramp elements and the flexible elements are regularly distributed about the central axis.

12. The hair-cutting unit as claimed claim 1, wherein:

a dimension of the flexible elements in a tangential direction about the central axis is smaller than a dimension of a space between adjacent ramp elements in said tangential direction; and the first plurality is larger than the second plurality, such that, in any relative rotational position of the external cutting member and the supporting member about the central axis, at least three of the flexible elements contact the upper sides of at least three of the ramp elements in case the relative rotation of the external cutting member and the supporting member is in the first rotational direction, and at least three of the flexible elements contact the lower sides of at least three of the ramp elements in case the relative rotation of the external cutting member and the supporting member is in the second rotational direction.

13. The hair-cutting unit as claimed in claim 1, wherein the first plurality is 15 and the second plurality is 12.

14. A shaving assembly, comprising at least one hair-cutting unit as claimed in claim 1 and a base unit supporting the at least one hair-cutting unit.

15. A rotary electric shaver comprising a main body and a shaving assembly as claimed in claim 14, wherein the base unit of the shaving assembly is connected to the main body.

* * * * *